(12) United States Patent
Heck

(10) Patent No.: US 6,370,777 B1
(45) Date of Patent: Apr. 16, 2002

(54) METHOD FOR PRODUCING A FULL FACE VEHICLE WHEEL

(75) Inventor: Thomas Heck, Monroe, MI (US)

(73) Assignee: Hayes Lemmerz International, Inc., Northville, MI (US)

(*) Notice: Subject to any disclaimer, the term of this patent is extended or adjusted under 35 U.S.C. 154(b) by 0 days.

(21) Appl. No.: 09/830,436
(22) PCT Filed: Dec. 22, 1999
(86) PCT No.: PCT/US99/30635
§ 371 Date: Apr. 25, 2001
§ 102(e) Date: Apr. 25, 2001
(87) PCT Pub. No.: WO00/40349
PCT Pub. Date: Jul. 13, 2000

Related U.S. Application Data
(60) Provisional application No. 60/114,124, filed on Dec. 30, 1998.

(51) Int. Cl.[7] .................................................. B23P 17/00
(52) U.S. Cl. .......................... 29/894.323; 29/894.322; 29/894.325; 29/894.353; 72/412
(58) Field of Search ................. 29/894.32–894.325, 29/894.35, 894.353; 72/353.4, 353.6, 412

(56) References Cited

U.S. PATENT DOCUMENTS

| | | | | |
|---|---|---|---|---|
| 2,586,029 A | * | 2/1952 | Greenshields et al. | 29/894.353 |
| 2,878,551 A | * | 3/1959 | Woodward | 29/894.353 |
| 2,944,502 A | * | 7/1960 | Lemmerz | 20/894.353 |
| 3,855,683 A | | 12/1974 | Philipp | |
| 5,531,024 A | | 7/1996 | Lowe et al. | |

FOREIGN PATENT DOCUMENTS

| DE | 149619 | 7/1981 |
|---|---|---|
| JP | 58006741 | 1/1983 |

* cited by examiner

Primary Examiner—P. W. Echols
(74) Attorney, Agent, or Firm—MacMillan, Sobanski & Todd, LLC

(57) ABSTRACT

A method for producing a full face vehicle wheel wherein at least the inboard tire bead seat is precisely oriented and located relative to all axis of the associated vehicle wheel includes the steps of: (a) providing a vehicle wheel assembly having a wheel rim and a wheel disc joined together and defining a horizontal wheel axis, the wheel rim including an inboard tire bead seat retaining flange, an inboard tire bead seat, a well and an outboard tire bead seat, the wheel disc including a wheel mounting portion and an outer annular portion which defines an outboard tire bead seat retaining flange of the vehicle wheel; (b) supporting the vehicle wheel assembly on a vehicle wheel fixturing and press apparatus including a wheel fixturing member and a wheel press member; and (c) selectively moving at least one of the wheel fixturing member and the wheel press member toward one another so as to engage and squeeze the inboard tire bead seat radially so as to expand the inboard tire bead seat in the radial direction to round up the radial runout of the inboard tire bead seat whereby an inner surface of the inboard tire bead seat is oriented and located at a desired radial distance relative to the horizontal wheel axis and in a generally concentric relationship therewith.

18 Claims, 5 Drawing Sheets

METHOD FOR PRODUCING A FULL FACE VEHICLE WHEEL

This Application is a 371 of PCT/U.S aplication Ser. No. 99/30635 filed Dec. 22, 1999, which claims benefit of Provisional No. 60/114,124 filed Dec. 30, 1998.

BACKGROUND OF THE INVENTION

This invention relates in general to vehicle wheels and in particular to an improved method and apparatus for producing a full face vehicle wheel.

A conventional vehicle wheel is typically of a two-piece construction and includes an inner disc and an outer "full" rim. The disc can be cast, forged, or fabricated from steel, aluminum, or other alloys, and includes an inner annular wheel mounting portion and an outer annular portion. The wheel mounting portion defines an inboard mounting surface and includes a center pilot or hub hole, and a plurality of lug receiving holes formed therethrough for mounting the wheel to an axle of the vehicle. The rim is fabricated from steel, aluminum, or other alloys, and includes an inboard tire bead seat retaining flange, an inboard tire bead seat, an axially extending well, an outboard tire bead seat, and an outboard tire bead seat retaining flange. In some instances, a three-piece wheel construction having a mounting cup secured to the disc is used. In both types of constructions, the outer annular portion of the disc is secured to the rim by welding.

A full face vehicle wheel is distinguished from other types of vehicle wheels by having a one-piece wheel disc construction. In particular, the fall face vehicle wheel includes a "fall face" disc and a "partial" rim. The full face wheel disc can be cast, forged, or fabricated from steel, aluminum, or other alloys. The fall face wheel disc includes an inner annular wheel mounting portion and an outer annular portion which defines at least a portion of an outboard tire bead seat retaining flange of the wheel. The wheel mounting portion defines an inboard mounting surface and includes a center pilot or hub hole, and a plurality of lug receiving holes formed therethrough for mounting the wheel to an axle of the vehicle. The partial wheel rim is fabricated from steel, aluminum, or other alloys, and includes an inboard tire bead seat retaining flange, an inboard tire bead seat, an axially extending well, and an outboard tire bead seat. In some instances, the outboard tire bead seat of the wheel rim and the outer annular portion of the wheel disc cooperate to form the outboard tire bead seat retaining flange of the full face vehicle wheel. In both types of constructions, the outboard tire bead seat of the wheel rim is positioned adjacent the outer annular portion of the wheel disc and a weld is applied to secure the wheel rim and the wheel disc together.

In the above vehicle wheel constructions, after the wheel disc and the wheel rim are welded together several finishing operations may be required to produce a wheel having the desired specifications. First, at least one of the inboard and outboard tire bead seats and/or at least one of the inboard and outboard tire bead seat retaining flanges may have to be generally be processed so that the tire bead seats are oriented and located concentric with the wheel axis (commonly referred to as "radial runout"), and the tire bead seat retaining flanges are oriented in a parallel relationship relative to an inboard mounting surface of the wheel disc (commonly-referred to as "lateral" or "axial" runout"). Following this, the location of center pilot hole, the lug receiving holes, or both may have to be corrected by an appropriate method, such as reboring the center pilot hole and repunching the lug receiving holes, so that an axis of the center pilot hole is oriented in a concentric relationship relative to the wheel axis and the tire bead seats and the axes of the lug receiving holes are oriented parallel to the wheel axis.

SUMMARY OF THE INVENTION

This invention relates to a method for producing a full face vehicle wheel wherein at least the inboard tire bead seat is precisely oriented and located relative to an axis of the associated vehicle wheel and includes the steps of: (a) providing a vehicle wheel assembly having a wheel rim and a wheel disc joined together and defining a generally horizontal wheel axis, the wheel rim including an inboard tire bead seat retaining flange, an inboard tire bead seat, a well, and an outboard tire bead seat, the inboar tire bead seat including an inner surface and an outer surface, the onbound tire bead seat retaining flange including an inner surface and an outer surface, the wheel disc including a wheel mounting portion and an outer annular portion, the wheel mounting portion provided with a center pilot aperture and a plurality of lug bolt receiving holes circumferentially spaced around the center pilot aperture, the wheel mounting portion including an inboard mounting surface which defines a vertical wheel axis which is generally perpendicular to the horizontal wheel axis, the outer annular portion of the wheel disc including an inner surface and an outer surface and defining an outboard tire bead seat retaining flange of the vehicle wheel; (b) supporting the vehicle wheel assembly on a vehicle wheel fixturing and press apparatus, the vehicle wheel fixturing and press apparatus including a wheel fixturing member and a wheel press member, the wheel fixturing member adapted to pilot the vehicle wheel assembly on the center pilot hole of the wheel disc, the wheel press member adapted to be piloted relative to the wheel fixturing member, the wheel fixturing member including an outer portion having a predetermined profile which is effective to locate laterally on at least a portion of the outer surface of the outboard tire bead seat retaining flange of the wheel disc, the wheel press member including a stepped outer portion defining a first outer portion and a second outer portion, the first outer portion effective to locate radially on at least a portion of the outer surface of the inboard tire bead seat of the wheel rim, and the second outer portion effective to locate laterally on at least a portion of the outer surface of the inboard tire bead seat retaining flange of the wheel rim; and (c) selectively moving at least one of the wheel fixturing member and the wheel press member toward one another so as to engage and squeeze the inboard tire bead seat radially so as to expand the inboard tire bead seat in the radial direction to round up the radial runout of the inboard tire bead seat and at the same time, to engage and squeeze the inboard and outboard tire bead seat retaining flanges laterally to true up the inboard and outboard tire bead seat retaining flanges to reduce the lateral runout of the inboard and outboard tire bead seat retaining flanges, whereby the inner surface of the inboard tire bead seat is oriented and located at a desired radial distance relative to the horizontal wheel axis and in a generally concentric relationship therewith, the outer surface of the inboard tire bead seat retaining flange is oriented and located at a desired lateral distance relative to the inboard mounting surface of the wheel disc and in a generally parallel relationship therewith, and the inner surface of the outboard tire bead seat retaining flange is oriented and located at a desired lateral distance relative to the inboard mounting surface of the wheel disc and in a generally parallel relationship therewith.

DESCRIPTION OF THE PREFERRED EMBODIMENTS

Figure 1:
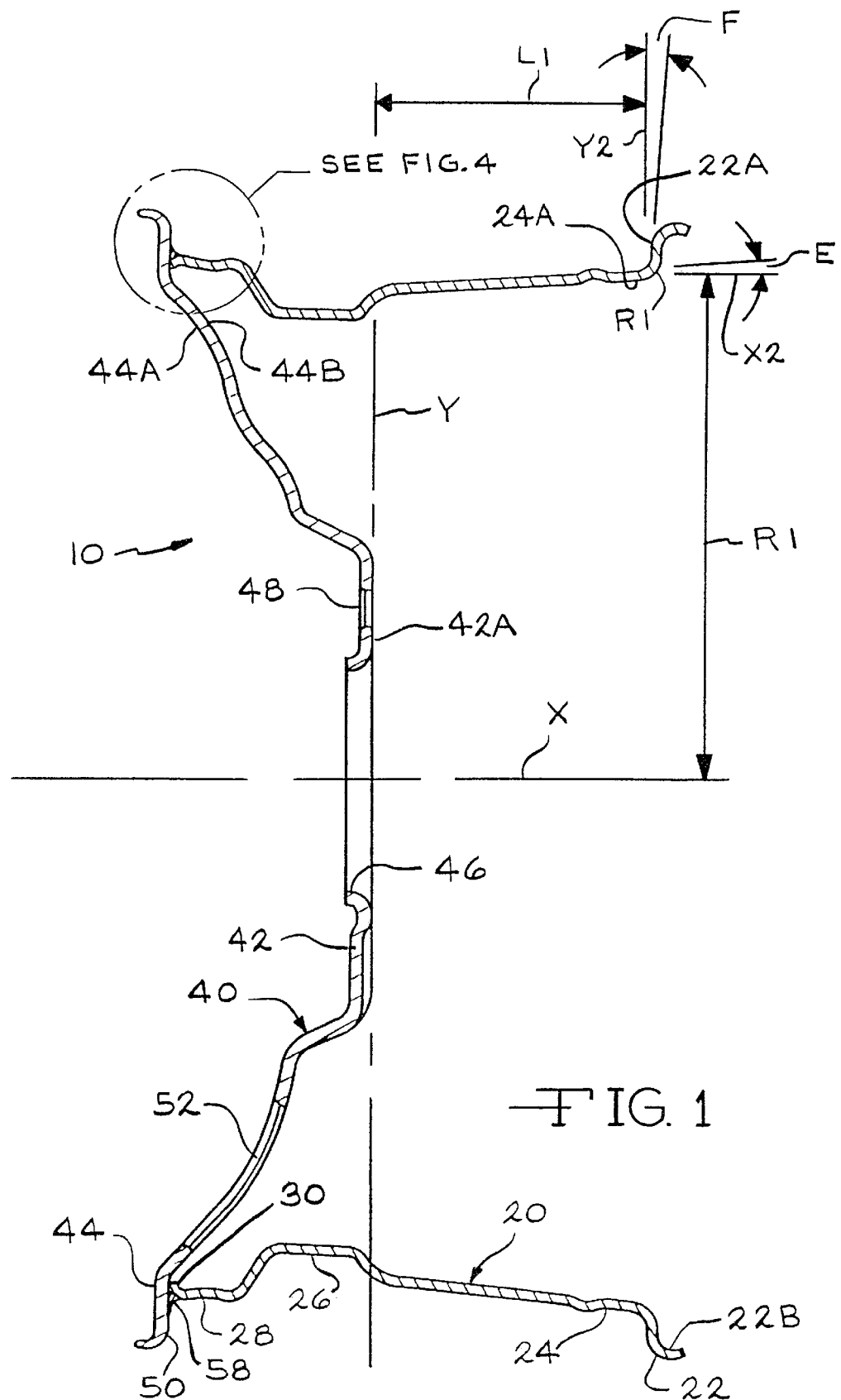
FIG. 1 is a sectional view of a first embodiment the full face vehicle wheel produced in accordance with the present invention.
Figure 2:
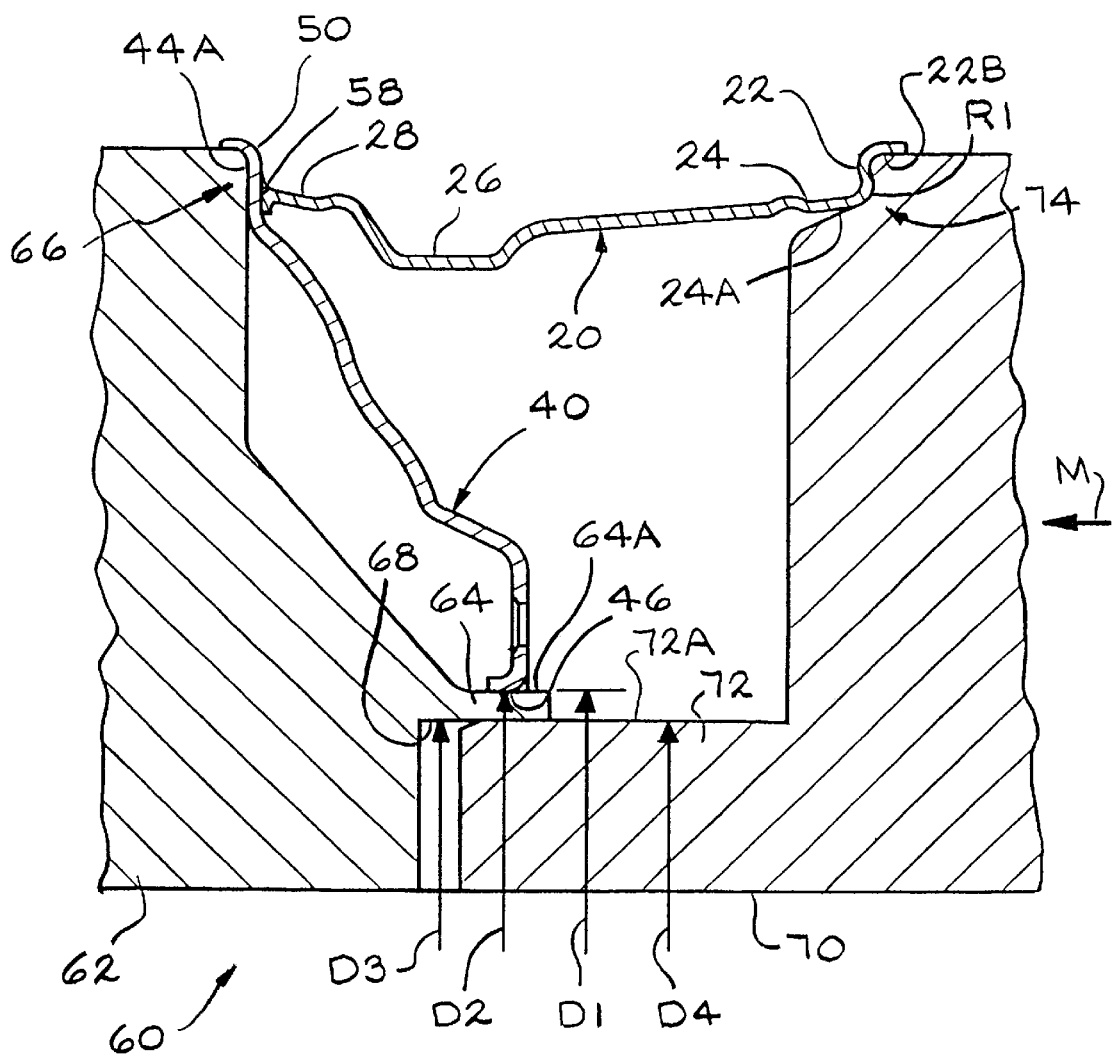
FIG. 2 is a sectional view showing a wheel press fixturing apparatus for producing the full face vehicle wheel illustrated in FIG. 1.

Referring now to FIG. 1, there is illustrated a first embodiment of a full face vehicle wheel, indicated generally at 10, produced using a wheel press and fixturing apparatus, indicated generally at 60 in FIG. 2, in accordance with the present invention. The full face vehicle wheel 10 includes a wheel rim 20 and a wheel disc 40 which are joined together by a weld during a welding operation. The full face vehicle wheel defines a horizontal or longitudinal vehicle wheel axis X.

In the illustrated embodiment, the wheel rim 20 is a fabricated wheel rim formed from a suitable material, such as for example, steel, aluminum or alloys thereof, magnesium, or titanium. The wheel rim 20 includes an inboard tire bead seat retaining flange 22, an inboard tire bead seat 24, a generally axially extending well 26, and an outboard tire bead seat 28.

Figure 4:
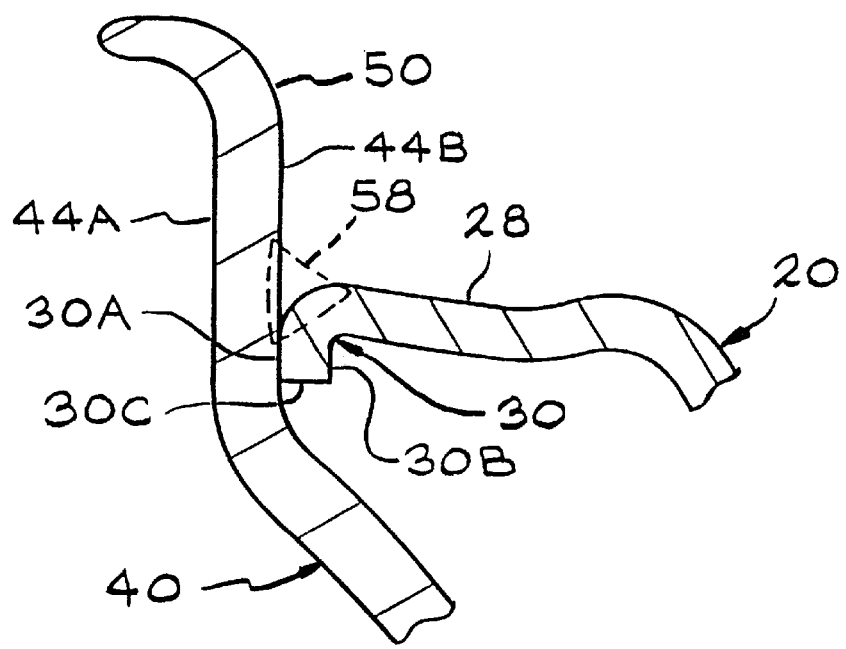
FIG. 4 is an enlarged sectional view of a portion of the full face vehicle wheel illustrated in FIGS. 1 and 2.
Figure 5:
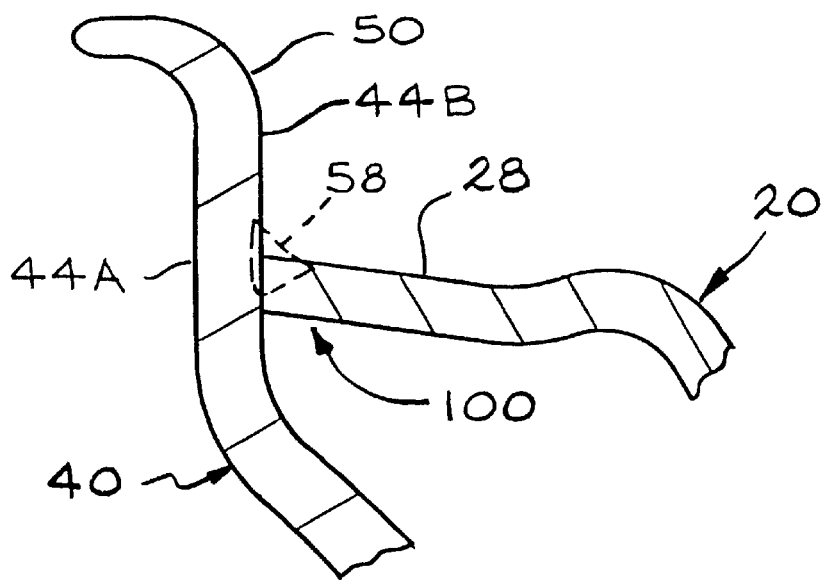
FIG. 5 is an enlarged sectional view of a portion of a second embodiment of a full face vehicle wheel produced in accordance with the present invention.
Figure 6:
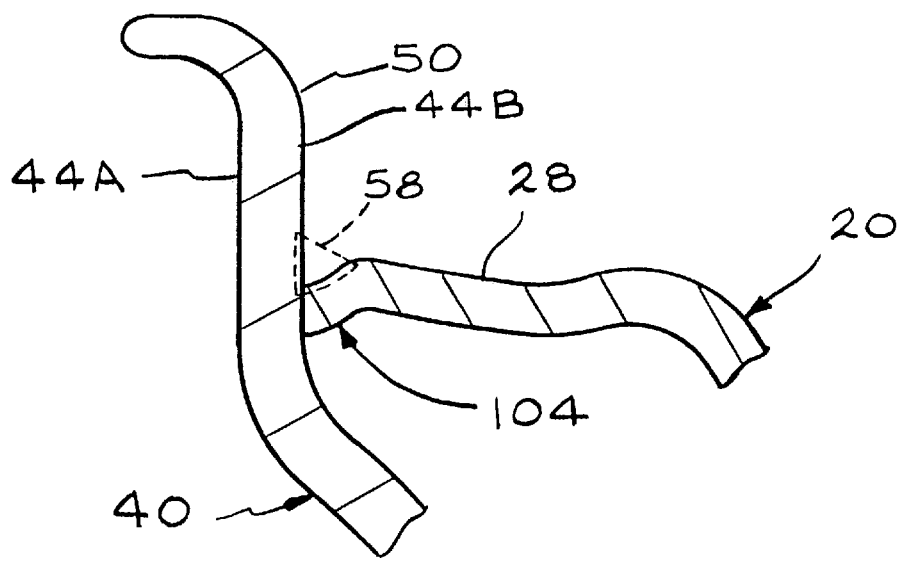
FIG. 6 is an enlarged sectional view of a portion of a third embodiment of a full face vehicle wheel produced in accordance with the present invention.
Figure 7:
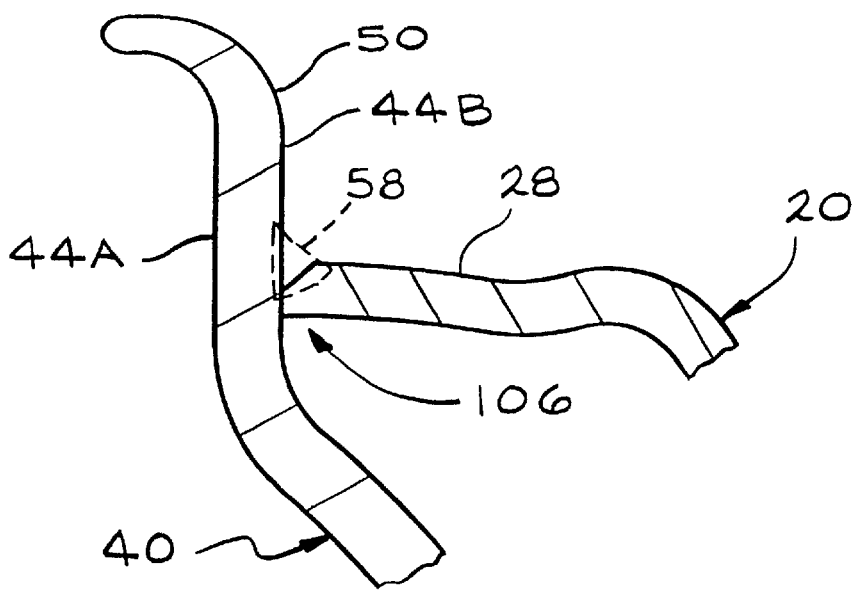
FIG. 7 is an enlarged sectional view of a portion of a fourth embodiment of a portion of a full face vehicle wheel produced in accordance with the present invention.

In the illustrated embodiment, the outboard tire bead seat 28 of the wheel rim 20 includes a radially inturned flange, indicated generally at 30, and best shown in FIG. 4. The flange 30 includes a generally radially inwardly extending outer surface 30A, a generally radially inwardly extending inner surface 30B, and a generally axially extending endmost surface 30C. Alternatively, the structure of the wheel rim 20 and/or the wheel disc 40 can be other than illustrated if desired. For example, the wheel rim 20 can have a generally "straight" outboard end, indicated generally at 100 in FIG. 5, a partly chamfered outboard end, indicated generally at 106 in FIG. 7, or an "offset" outboard end, indicated generally at 104 in FIG. 6.

In the illustrated embodiment, the wheel disc 40 is forged, cast, fabricated, or otherwise formed from a suitable material, such as for example, steel, aluminum or alloys thereof, steel, magnesium, or titanium. The wheel disc 40 includes a generally centrally located wheel mounting portion 42 and an outer annular portion 44. The wheel mounting portion 42 is provided with a centrally located pilot aperture 46 and a plurality of lug bolt receiving holes 48 (only one lug bolt hole 48 being illustrated) circumferentially spaced around the pilot aperture 46. The lug bolt receiving holes 48 receive lug bolts and nuts (not shown) for securing the vehicle wheel 10 on an axle (not shown) of a vehicle. The wheel mounting portion 42 includes an inboard mounting surface 42A which defines a vertical axis Y which is perpendicular to the vehicle wheel axis X.

The outer annular portion 44 of the wheel disc 40 includes an outer surface 44A and an inner surface 44B, and defines an outboard tire bead seat retaining flange 50 of the vehicle wheel 10. The wheel disc 40 may also include a plurality of decorative openings or windows 52 (only one of decorative opening being illustrated). To assemble the vehicle wheel 10, the outer surface 30A of the inturned flange 30 of the wheel rim 20 is positioned against the inner surface 44B of the outer annular portion 44 of the wheel disc 40, and a weld 58 is provided to join the wheel disc 40 and the wheel rim 20 together, as shown in FIGS. 1 and 2.

In accordance with the present invention, the assembled (i.e., welded) vehicle wheel 10 is positioned in the wheel press and fixturing apparatus 60 in accordance with the present invention. The assembled vehicle wheel 10 is "fully" assembled and processed to predetermined specifications (i.e., the center pilot hole 46 and the lug bolt receiving holes 48 are formed and finished to predetermined specifications). However, in some instances, the inboard tire bead seat 24 and/or the inboard tire bead seat retaining flange 22 may not be within customer specifications. In accordance with the present invention, as will be discussed, the wheel press and fixturing apparatus 60 is operative to further process the inboard tire bead seat 24 and/or the inboard tire bead seat retaining flange 22 to attain desired tolerances and thereby produce the full face vehicle wheel 10 of the present invention.

Figure 3:
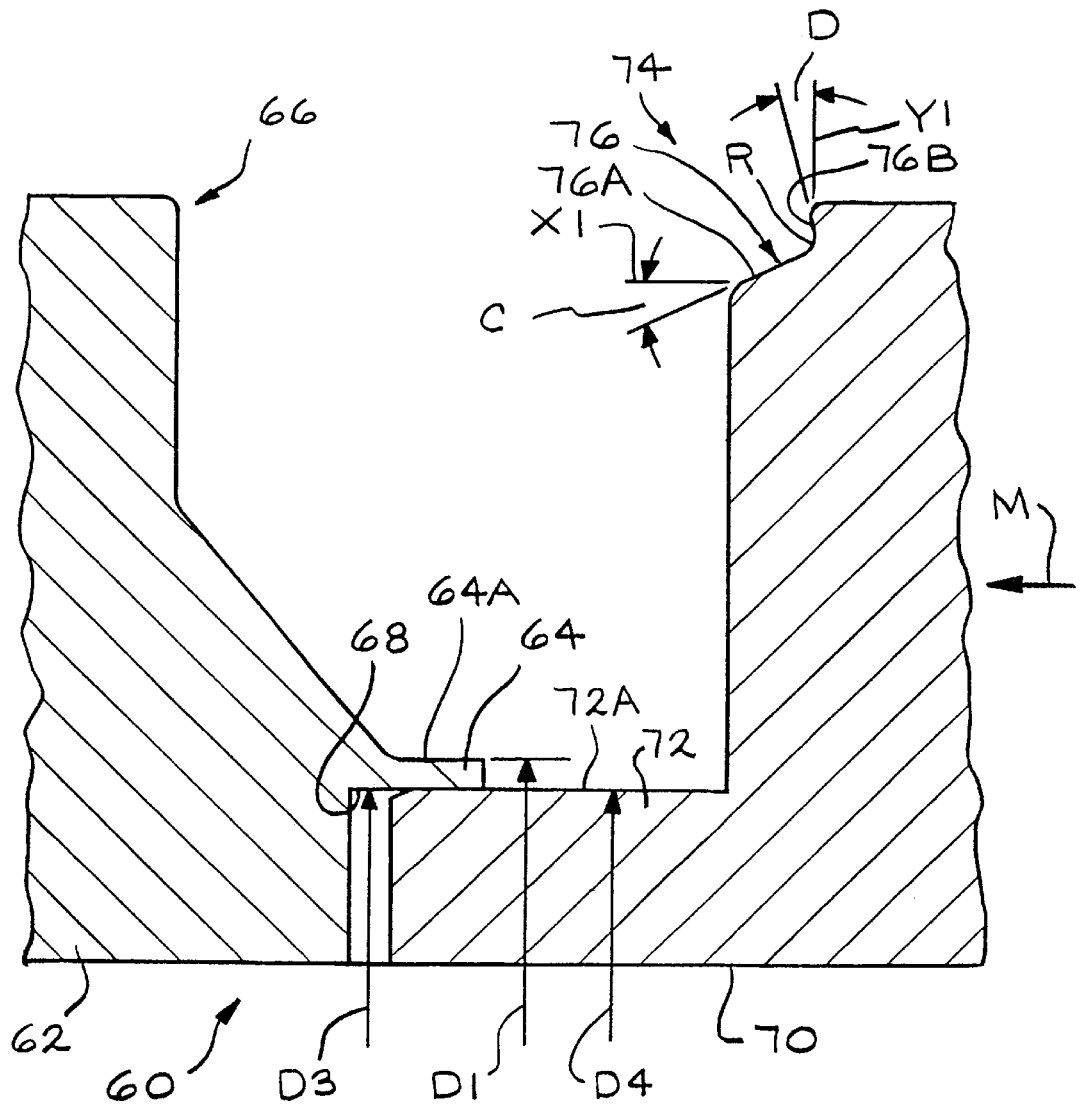
FIG. 3 is a sectional view showing only the wheel press fixturing apparatus illustrated in FIG. 2.

As shown in this embodiment, the wheel press and fixturing apparatus 60 includes a wheel fixturing member 62 and a wheel press member 70. As best shown in FIG. 3, the wheel fixturing member 62 includes an inner annular extension 64 and an outer portion, indicated generally at 66. The annular extension 64 of the wheel fixturing member 62 is effective to pilot the vehicle wheel assembly 10 on the center pilot hole 46 of the wheel disc 40. To accomplish this, the extension 64 includes an outer surface 64A which defines an outer diameter D1 which is slightly smaller than an inner diameter D2 defined by the center pilot hole 46 so as to receive the wheel disc 40, and therefore the wheel assembly, in a press-fit relationship thereon. The extension 64 of the wheel fixturing member 62 defines a bore or opening 68. As will be discussed below, an inner surface of the bore 68 defines an inner diameter D3 which is effective to pilot the wheel press member 70 relative to the wheel fixturing member 62. The outer portion 66 of the wheel fixturing member 62 includes a predetermined profile which is effective to locate laterally on the outer surface 44A of the outboard tire bead seat retaining flange 44 of the wheel disc 40.

The wheel press member 70 includes an inner annular extension 72 and an outer portion, indicated generally at 74. The annular extension 72 of the wheel press member 70 is effective to pilot the wheel press member 70 relative to the wheel fixturing member 62. To accomplish this, the extension 72 includes an outer surface 72A which defines an outer diameter D4 which is slightly smaller than the inner diameter D3 defined by the bore 68 of the extension 64 of the wheel fixturing member 62.

The outer portion 74 of the wheel press member 70 includes a stepped portion 76 having a predetermined profile and including a first portion 76A and a second portion 76B. The first portion 76A is effective to locate radially on a portion of an inner surface 24A of the inboard tire bead seat 24, and the second portion 76B is effective to locate laterally on inner surface 22B of the inboard tire bead seat retaining flange 22 of the wheel rim 20. Preferably, as illustrated in this embodiment, the press member 70 includes a relieved radius R provided at the transition of the first portion 76A and the second portion 76B. The relieved radius R is provided in the wheel press member 70 to clear an associated radius R1 provided in an inner surface of the wheel rim 20 at the transition between the inboard tire bead seat retaining flange 22 and the inboard tire bead seat 24. As shown in FIG. 2, the predetermined profile of the first portion 76A and the second portion 76B of the press member 70 generally correspond to the respective profiles of the inboard tire bead seat 24 and the inboard tire bead seat retaining flange 22 of the wheel rim 20.

As discussed above, the assembled vehicle wheel 10 is "fully" assembled except that the inboard tire bead seat 24 and/or the inboard tire bead seat retaining flange 22 may not be within customer specifications/industry standards. In particular, the inboard tire bead seat 24 may be at an angle which is below accepted industry standards, and/or the inboard tire bead seat retaining flange 22 may be at an angle which also is unacceptable. In accordance with the present invention, the wheel press and fixturing apparatus 60 is operative to "squeeze" the vehicle wheel between the associated tire bead seats 24 and 28 and expand the inboard tire bead set 24 in the radial direction to "round up" the radial runout in the vehicle wheel. To accomplish this, the vehicle wheel 10 is supported by the wheel press and fixturing apparatus 60 and in the illustrated embodiment, the wheel press member 70 is selectively moved toward the wheel fixturing member 62 in the direction of the arrow M shown in FIG. 2. In the illustrated embodiment, the wheel press and fixturing apparatus 60 is shown being a horizontal apparatus; however, the orientation of the apparatus 60 can be other than illustrated if desired. Also, in the illustrated embodiment, only the wheel press member 70 is selectively moved; however, the wheel fixture member 62 or both the wheel fixture member 62 and the wheel press member 70 can be selectively movable if desired.

During such controlled movement, the respective inboard and outboard bead seats 24 and 28 of the vehicle wheel 10 are squeezed between the respective outer portions 66 and 74 of the wheel press and fixturing apparatus 60 to expand the inboard tire bead seat 24 in the radial direction to "round up" the radial runout thereof. Also, at the same time, the wheel press and fixturing apparatus 60 is operative to squeeze the inboard tire bead seat retaining flange 22 laterally to "true up" the inboard tire bead seat retaining flange 22 to reduce the lateral runout. To accomplish this, the wheel press and fixturing apparatus 60 of this invention includes an angle C on the portion 76A of the stepped portion 76, and an angle D on the portion 76B of the stepped portion 76. The angle C is relative to a horizontal axis X1 which is parallel to a horizontal axis X of the vehicle wheel 10 (i.e., the horizontal axis of the center pilot hole 46), and the angle D is relative to a vertical axis Y1 which is perpendicular to the vehicle wheel horizontal axis X. The angles C and D of the wheel press and fixturing apparatus 60 are predetermined to accommodate for a "spring back" affect that occurs when the vehicle wheel 10 is removed from the wheel apparatus 60 so as to maintain a desired angle E of the inboard tire bead seat 24 and a desired angle F of the inboard tire bead seat retaining flange 22 which are within accepted industry standards. The angle E is relative to a horizontal axis X2 which is parallel to the horizontal axis X of the vehicle wheel 10, and the angle F is relative to a vertical axis Y2 which is perpendicular to the horizontal axis X of the vehicle wheel 10 and parallel to the vertical axis Y of the vehicle wheel 10. The term spring back as used herein refers to the inherent property of the material of the vehicle wheel to return completely or partially to its original geometry when the vehicle wheel 10 is removed from the wheel press and fixturing apparatus 60. As shown in FIG. 1, the angle E is from about 3 degrees to about 4 degrees, and the angle F is from about 1 degrees to about 2 degrees. To accomplish this, the angle C on the press member 70 is generally from about 5 degrees to about 6 degrees, and the angle D on the press member 70 is from about 0 degrees to about 1 degrees. However, due to the structure of the particular vehicle wheel 10, one or more of the angles C, D, E and F can be other than illustrated.

By squeezing the inboard and outboard tire bead seat retaining flanges 22 and 50, respectively, and expanding the inboard tire bead seat 24 after the wheel disc 40 and the wheel rim 20 have been secured together, the inboard tire bead seat retaining flange 22 of the finished vehicle wheel 10 is precisely oriented and located relative to the inboard mounting surface 42A of the wheel disc 40, and the inboard tire bead seat 24 of the finished vehicle wheel 10 is precisely oriented and located relative to the axes X and Y of the vehicle wheel 10.

In particular, an outer surface 22A of the inboard tire bead seat retaining flange 22 of the finished vehicle wheel 10 is precisely oriented and located a lateral or axial distance L1 relative to the inboard mounting surface 42A of the wheel disc 40 and in a generally parallel relationship therewith, and the inner surface 24A of the inboard tire bead seat 24 of the finished vehicle wheel 10 is precisely oriented and located a radial distance R1 relative to the wheel axis X and in a generally concentric relationship therewith.

In accordance with the provisions of the patents statues, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A method for producing a full face vehicle wheel comprising the steps of:

(a) providing a vehicle wheel assembly having a wheel rim and a wheel disc joined together and defining a generally horizontal wheel axis, the wheel rim including an inboard tire bead seat retaining flange, an inboard tire bead seat, a well, and an outboard tire bead seat, the inboard tire bead seat including an inner surface and an outer surface, the inboard tire bead seat retaining flange including an inner surface and an outer surface, the wheel disc including a wheel mounting portion and an outer annular portion, the wheel mounting portion provided with a center pilot aperture and a plurality of lug bolt receiving holes circumferentially spaced around the center pilot aperture, the wheel mounting portion including an inboard mounting surface which defines a vertical wheel axis which is generally perpendicular to the horizontal wheel axis, the outer annular portion of the wheel disc including an inner surface and an outer surface and defining an outboard tire bead seat retaining flange of the vehicle wheel;

(b) supporting the vehicle wheel assembly on a vehicle wheel fixturing and press apparatus, the vehicle wheel fixturing and press apparatus including a wheel fixturing member and a wheel press member, the wheel fixturing member adapted to pilot the vehicle wheel assembly on the center pilot hole of the wheel disc, the wheel press member adapted to be piloted relative to the wheel fixturing member, the wheel fixturing member including an outer portion having a predetermined profile which is effective to locate laterally on at least a portion of the outer surface of the outboard tire bead seat retaining flange of the wheel disc, the wheel press member including a stepped outer portion defining a first outer portion and a second outer portion, the first outer portion effective to locate radially on at least a portion of the inner surface of the inboard tire bead seat of the wheel rim, and the second outer portion effective to locate laterally on at least a portion of the inner surface of the inboard tire bead seat retaining flange of the wheel rim; and (c) selectively moving at least one of the wheel fixturing member and the wheel press member toward one another so as to engage and squeeze the inboard tire bead seat radially so as to expand the inboard tire bead seat in the radial direction to round up the radial runout of the inboard tire bead seat whereby the inner surface of the inboard tire bead seat is oriented and located at a desired radial distance relative to the horizontal wheel axis and in a generally concentric relationship therewith.

2. The method according to claim 1 wherein step (c) further includes selectively moving at least one of the wheel fixturing member and the wheel press member toward one another so as to engage and squeeze the inboard tire bead seat radially so as to expand the inboard tire bead seat in the radial direction to round up the radial runout of the inboard tire bead seat and at the same time, to squeeze the inboard and outboard tire bead seat retaining flanges laterally to true up the inboard tire bead seat retaining flange to reduce the lateral runout of the inboard tire bead seat retaining flange, whereby an outer surface of the inboard tire bead seat retaining flange is oriented and located at a desired lateral distance relative to the inboard mounting surface of the wheel disc and in a generally parallel relationship therewith.

3. The method according to claim 1 wherein the wheel fixturing member includes an inner annular extension, the inner annular extension of the wheel fixturing member includes an outer surface which defines an outer diameter which is slightly smaller than an inner diameter defined by the center pilot hole so as to receive the wheel disc in a press-fit relationship thereon.

4. The method according to claim 1 wherein the wheel fixturing member includes an inner annular extension, the extension of the wheel fixturing member includes an opening, the opening having an inner surface which defines an inner diameter, the wheel press member includes an inner annular extension, the extension of the wheel press member having an outer surface which defines an outer diameter which is slightly smaller than the inner diameter defined by the opening of the extension of the wheel fixturing member so as to pilot the wheel press member relative the wheel fixturing member.

5. The method according to claim 1 wherein the press member includes a relieved radius provided at the transition of the first portion and the second portion to clear an associated radius provided in inner surface of the wheel rim at the transition between the inboard tire bead seat retaining flange and the inboard tire bead seat.

6. The method according to claim 1 wherein the first portion of the outer portion of the wheel press member defines a first angle relative to a first portion horizontal axis which is generally parallel to the wheel horizontal axis, and the second portion of the wheel press member defines a second angle relative to a second portion vertical axis which is generally perpendicular to the wheel horizontal axis, the first angle and the second angle being selected so as to accommodate for a spring back affect that occurs when the vehicle wheel is removed from the vehicle wheel fixturing and press apparatus so as to maintain a desired inboard tire bead seat angle and a desired inboard tire bead seat retaining flange angle.

7. The method according to claim 6 wherein the first angle is generally from about 5 degrees to about 6 degrees, the second angle is from about 0 degrees to about 1 degrees.

8. The method according to claim 6 wherein the inboard tire bead seat angle is from about 3 degrees to about 4 degrees, and the inboard tire bead seat retaining flange angle is from about 1 degrees to about 2 degrees.

9. The method according to claim 6 wherein the first angle is generally from about 5 degrees to about 6 degrees, the second angle is from about 0 degrees to about 1 degrees, the inboard tire bead seat angle is from about 3 degrees to about 4 degrees, and the inboard tire bead seat retaining flange angle is from about 1 degrees to about 2 degrees.

10. The method according to claim 1 wherein during step (c) the inner surface of the inboard tire bead seat retaining flange is engaged and squeezed so as to orient and locate the outer surface of the inboard tire bead seat retaining flange a desired lateral distance relative to the inboard mounting surface of the wheel disc and in a generally parallel relationship therewith.

11. The method according to claim 1 wherein during step (c) the outer surface of the outboard tire bead seat retaining flange is engaged and squeezed so as to orient and locate the inner surface of the outboard tire bead seat retaining flange a desired lateral distance relative to the inboard mounting surface of the wheel disc and in a generally parallel relationship therewith.

12. The method according to claim 1 wherein the wheel rim and the wheel disc are formed from steel.

13. The method according to claim 1 wherein the wheel rim and the wheel disc are formed from aluminum.

14. The method according to claim 1 wherein the wheel rim and the wheel disc are formed from different materials.

15. The method according to claim 1 wherein the outboard tire bead seat of the wheel rim includes a generally radially inturned flange.

16. The method according to claim 1 wherein the outboard tire bead seat of the wheel rim includes a generally straight outboard end.

17. The method according to claim 1 wherein the outboard tire bead seat of the wheel rim includes a partially chamfered outboard end.

18. The method according to claim 1 wherein the outboard tire bead seat of the wheel rim includes a generally offset outboard end.

* * * * *